United States Patent
Herre (10) Patent No.: US 9,703,283 B2
(45) Date of Patent: Jul. 11, 2017

(54) ADAPTING THE DYNAMICS OF AT LEAST ONE ROBOT

(75) Inventor: Frank Herre, Oberriexingen (DE)

(73) Assignee: Durr Systems GmbH, Bietigheim-Bissingen (DE)

( * ) Notice: Subject to any disclaimer, the term of this patent is extended or adjusted under 35 U.S.C. 154(b) by 261 days.

(21) Appl. No.: 13/982,493

(22) PCT Filed: Feb. 6, 2012

(86) PCT No.: PCT/EP2012/000531
§ 371 (c)(1),
(2), (4) Date: Oct. 15, 2013

(87) PCT Pub. No.: WO2012/107199
PCT Pub. Date: Aug. 16, 2012

(65) Prior Publication Data
US 2014/0052294 A1    Feb. 20, 2014

(30) Foreign Application Priority Data
Feb. 7, 2011   (DE) .......... 10 2011 010 505

(51) Int. Cl.
*G05B 19/418* (2006.01)
*B05B 13/04* (2006.01)
(Continued)

(52) U.S. Cl.
CPC ........ *G05B 19/418* (2013.01); *B05B 13/0431* (2013.01); *B25J 9/1651* (2013.01);
(Continued)

(58) Field of Classification Search
CPC .. G05B 19/404; G05B 19/416; G05B 19/418; G05B 19/41815; G05B 19/41835; G05B 2219/37252; G05B 2219/39144; B25J 9/1651; B25J 9/1669; B05B 13/0431; B05B 13/0292; Y10S 901/43
See application file for complete search history.

(56) References Cited

U.S. PATENT DOCUMENTS

| 5,325,467 A | 6/1994 | Torii et al. |
| 5,751,130 A * | 5/1998 | Hara ................... G05B 19/416 318/568.2 |

(Continued)

FOREIGN PATENT DOCUMENTS

| CN | 101449220 A | 6/2009 |
| CN | 101678551 A | 3/2010 |

(Continued)

*Primary Examiner* — Spencer Patton
(74) *Attorney, Agent, or Firm* — Bejin Bieneman PLC (57) ABSTRACT

A first robot and at least one further second robot are provided to run through a plurality of positioning ranges during operation. A dynamic behavior and/or a load characteristic value of the robot in at least one first positioning range can be adapted to a dynamic behavior and/or a load characteristic value in at least one second positioning range of the robot and/or a dynamic behavior and/or a load characteristic value of the first robot in at least one first positioning range is adapted to a dynamic behavior and/or a load characteristic value of the second robot in at least one second positioning range.

19 Claims, 6 Drawing Sheets

(51) Int. Cl.
 B25J 9/16 (2006.01)
 G05B 19/404 (2006.01)
 G05B 19/416 (2006.01)
 B05B 13/02 (2006.01)
(52) U.S. Cl.
 CPC ......... *G05B 19/404* (2013.01); *G05B 19/416* (2013.01); *G05B 19/41815* (2013.01); *B05B 13/0292* (2013.01); *G05B 2219/37252* (2013.01); *G05B 2219/39144* (2013.01); *G05B 2219/39364* (2013.01); *G05B 2219/40318* (2013.01); *G05B 2219/40453* (2013.01); *G05B 2219/40454* (2013.01); *G05B 2219/40552* (2013.01); *G05B 2219/43062* (2013.01); *G05B 2219/43203* (2013.01); *G05B 2219/45013* (2013.01); *G05B 2219/45238* (2013.01); *Y02P 90/08* (2015.11); *Y02P 90/083* (2015.11); *Y02P 90/265* (2015.11); *Y10S 901/43* (2013.01)

(56) References Cited

U.S. PATENT DOCUMENTS

| | | | |
|---|---|---|---|
| 6,230,079 | B1 | 5/2001 | Brogardh et al. |
| 2003/0014156 | A1 | 1/2003 | Hashimoto et al. |
| 2004/0199290 | A1* | 10/2004 | Stoddard ............... B25J 9/1669 700/248 |
| 2005/0196543 | A1* | 9/2005 | Morton ................ B05B 12/124 427/421.1 |
| 2005/0273198 | A1 | 12/2005 | Bischoff |
| 2005/0273202 | A1 | 12/2005 | Bischoff |
| 2005/0278067 | A1 | 12/2005 | Bader et al. |
| 2006/0287768 | A1 | 12/2006 | Bader et al. |
| 2007/0042123 | A1* | 2/2007 | Endregaard et al. ...... 427/421.1 |
| 2008/0247549 | A1* | 10/2008 | Blanc et al. ................. 380/277 |
| 2009/0074979 | A1 | 3/2009 | Krogedal et al. |
| 2010/0198405 | A1 | 8/2010 | Hacker et al. |
| 2011/0011323 | A1* | 1/2011 | Wiggins ................... B63B 1/16 114/245 |

FOREIGN PATENT DOCUMENTS

| | | | |
|---|---|---|---|
| CN | 101791801 A | | 8/2010 |
| DE | 10349361 A1 | | 5/2005 |
| DE | 202005007654 U1 | | 10/2005 |
| DE | 102004026813 A1 | | 12/2005 |
| DE | 102004026814 A1 | | 12/2005 |
| DE | 102004028565 A1 | | 1/2006 |
| DE | 102004028557 A1 | | 2/2006 |
| JP | H03229661 A | | 10/1991 |
| JP | H0584678 A | | 4/1993 |
| JP | H06262553 A | | 9/1994 |
| JP | H0997106 A | | 4/1997 |
| JP | 09136287 A | * 5/1997 | ............. B25J 19/06 |
| JP | 2000504279 A | | 4/2000 |
| JP | 2003300187 A | | 10/2003 |
| JP | 2004020388 A | | 1/2004 |
| JP | WO 2005063454 A1 | * 7/2005 | ............. B25J 9/1682 |
| JP | 2010012544 A | | 1/2010 |

\* cited by examiner

ADAPTING THE DYNAMICS OF AT LEAST ONE ROBOT

A robot, or a first robot and at least one further second robot, may be used for coating of at least one workpiece or a plurality of workpieces. A corresponding control system, a corresponding computer program and/or instructions stored on a computer-readable medium, a corresponding computer and/or a corresponding data processing unit, and one or more corresponding robots may be included in an exemplary system. The system offers advantages when used in a painting installation, e.g., for painting of motor vehicle bodies, attachment parts for motor vehicle bodies, small parts, bumpers and/or bumper bar elements, bumper bars, bumper strips, etc.

Conventionally, multi-axial painting robots are used in modern painting installations for painting motor vehicle bodies and attachment parts for motor vehicle bodies to guide the application equipment, for example a rotary atomizer.

There are basically two options known to optimize capacity of a painting robot during painting.

First, in as far as a drive system allows, is to move the painting robot at a constant speed along a prescribed painting path and in doing so not to deviate from the prescribed painting path. Therefore there is no deviation from the path or the prescribed speed in this scenario. This leads to maximum permissible loading of the painting robot and to a theoretically best distribution of the paint layer thickness and reproducibility on the workpiece to be painted.

If this design cannot be executed, for example due to certain limitations, in particular exceeding of the maximum motor torque of a maximum permissible torque of the painting robot, then there are essentially the following four options (A, B, C and D) described below to address such limiting situations.

A. The robot stops at the critical point, and the teacher (path programmer) must alter a painting program in such a way that the painting robot can execute the program in the future.

B. The path is traversed correctly. However, the painting robot reduces its speed in order to be able to traverse the path correctly.

C. The speed is kept constant. The painting robot does, however, deviate from the painting path (for example it moves along a radius instead of a corner, it moves along a larger radius instead of a small radius, it moves along path fragments/sequences which are not described in greater detail which shorten the path between two specified points).

D. A combination of B and C. Both the path followed and the speed are not according to the specification included in a control program).

The second option referred to above is to move the painting robot within the limits of its maximum possible acceleration and/or speed according to a painting control program. A calculation model that calculates the load on individual axles of the painting robot prevents overloading of the mechanical components by lowering the drive torque and/or lowering the acceleration or speed, which is known as a dynamic robot model. In this way the service life, and/or durability, etc., of the painting robot can be extended and/or its performance used almost optimally. The lowering of drive torque does, however, lead to a reduction in the speed and/or a deviation from a prescribed path. This means, for example, that high accelerations are possible in a near area of the painting robot where there are usually relatively low loads, but lower accelerations in a remote area, for example for an extended condition of the painting robot, where there are usually relatively high loads.

What is desirable for use of the painting robot is disadvantageous for a desired painting result. The best painting results are usually achieved when the painting parameters can be kept constant, e.g., painting speed, acceleration, and a painting path and/or the reproducibility of the path. Compensation of some parameter deviations of the painting robot can only be undertaken with great difficulty or not balanced entirely by the painting equipment.

A further problem is that deviations of speed, and/or acceleration, and/or a painting path lead to deviations in the optimal application of the paint and/or to uneven painting results, such as deviations in the layer thickness, deviations in the color tone, and an uneven appearance of the painting result. It is furthermore possible that a run time and/or a cycle time of a painting program is influenced (e.g., extended or shortened) and is more difficult to predict.

A further issue relates to changes in painting path sequences of a painting installation. Many processes in a painting installation and/or painting cabin can generate deviations in a program start or an offset of the program (for example measurement of the workpiece to be painted and compensation for an imprecise position of the workpiece to be painted, behavior in the event of a fault and restart, waiting for process release by the processing equipment such as rotational speed, high voltage, flushing programs, docking, etc.). There is also the behavior that, in the event of a fault in the painting robot, the painting program, the painting model or the painting path is fully painted and/or traversed, even though the conveyor belt transporting the workpiece was stopped. In this scenario, robot paths are traversed differently than usual, leading to a changed path sequencing. Altered robot paths may lie in areas that are more difficult for the painting robot to reach. This may lead in turn to a reduction or a collapse in the acceleration or speed or, in the event of deviation from the robot path, to problems with reproducibility.

A further problem is the ability to copy painting programs, which may be explained taking an example of painting attachment parts. During painting of attachment parts, a plurality of attachment parts is often arranged one above the other. Each attachment part is essentially identical, should be painted in the same way and also, for simplicity, be specified in the same way to facilitate copying. If the programs are now copied, problems can arise, for example, that one attachment part is easy to reach (e.g., in a near area of the robot, for example below a goods carrier), whereas another attachment part can only be reached with difficulty (e.g., in a remote area of the robot, for example above a goods carrier). This now leads to a situation where the attachment parts are painted at different speeds and/or with different accelerations and/or robot paths because the programs run with respect to (a) lower part(s) without any reduction, and/or undershoot and/or deviation, but this is not the case above. The painting result can therefore be different even though the programs and/or painting paths are identical. The deviations can occur from above downwards, from the right to the left, from the front to the rear, dependent on the arrangement of the painting robot, the painting object and the painting programs.

The above-mentioned problems were discussed in an exemplary manner with reference to painting processes. Some of the above-mentioned problems also occur for other application processes accordingly, for example for application of sealing materials (for example for seam sealing), adhesive materials, etc. to motor vehicle bodies or their attachment parts.

For general technological background, reference is also made to DE 101 33 624 A1, DE 10 2004 026 813 A1, DE 20 2005 007 654 A1, WO 2005/063454 A1, DE 10 2004 028 557 A1, DE 10 2004 028 565 A1 and DE 103 49 361 A1.

The present invention is defined by the claims. The invention is not limited to embodiments that remedy all of the current problems or disadvantages discussed herein. The invention also claims general protection for the exemplary embodiments described below.

Disclosed herein are systems and methods for adapting deviating dynamic behaviors and/or load characteristic values of a robot or two, three, or a greater plurality of robots to each another, e.g., to at least approximately match them together, e.g., cause the robots to correspond with one another, in an essentially identical and/or symmetrical (e.g., having mirror symmetry), manner.

It is possible that a robot and/or a first robot and at least one further second robot adopts and/or runs through many positioning ranges during operation, for example when running along a (e.g., meandrous) robot path or a plurality of robot paths, or a least sections thereof.

During operation, robots are usually subjected to different maximum permissible loads in different positioning ranges (for example a near area and a remote area of the robot), leading to a different maximum permissible dynamic behavior (for example, different maximum permissible accelerations, different maximum permissible speeds, and/or at least slightly different robot paths).

It is furthermore usual that even identically constructed robots in the same positioning ranges or positioning ranges that correspond with one another, for example, if the robots are positioned mirror-inverted or next to one another and/or in series, have different load characteristic values and/or a different dynamic behavior. The differences can arise from tolerances of mechanical components (axles, transmission, guides, bearing points, etc.), tolerances of drives (controller, dynamics, motors, transducers, etc.), deviations in weight, age of the robots, maintenance condition, but also due to different levels of wear. Weight differences can, e.g., occur due to application equipment used. The application equipment is usually the load the robot is designed to handle. This varies very strongly according to the type of paint to be applied, the application version, the workpiece to be coated, the painting task and customer requirements etc., from a few kilograms to high loads on the hand axle and the robot arms. This leads to a situation where even identical robots in the same positioning range or positioning ranges which correspond to one another have different robot dynamics.

Robot dynamics which deviate from one another for painting robots used to apply paint can lead to undesirable and/or deviating painting results. This is disadvantageous since it is desirable that the painting result on a motor vehicle body, for example on the left and the right, corresponds (e.g., are identical or symmetrical), or a plurality of identically constructed attachment parts or a plurality of identically constructed motor vehicle bodies have a corresponding (e.g., identical or symmetrical) painting result.

As disclosed herein, it is possible that a dynamic behavior and/or a load characteristic value of the robot in at least a first positioning range of the robot and/or may be adapted to a dynamic behavior and/or a load characteristic value of the robot in at least a second positioning range of the robot, preferably in such a way that the dynamic behavior and/or the load characteristic value of the first positioning range essentially corresponds with the dynamic behavior and/or the load characteristic value of the second positioning range, i.e. it is essentially identical or symmetrical.

It is also possible that a dynamic behavior and/or a load characteristic value of the first robot in at least a first positioning range of the first robot and/or may be adapted to a dynamic behavior and/or a load characteristic value of the second robot in at least a second positioning range of the second robot, e.g., in such a way that the dynamic behavior and/or the load characteristic value of the first positioning range essentially corresponds with the dynamic behavior and/or the load characteristic value of the second positioning range, i.e., it is essentially identical or symmetrical.

A robot may have an essentially corresponding dynamic behavior in different positioning ranges, and/or a first robot and a second robot may have essentially a corresponding dynamic behavior, despite at least minor differences (for example tolerances, weight, wear, etc.). For example, such an adaptation is possible between a plurality of robots that are configured to perform one after the other essentially the same painting tasks and/or that essentially should traverse the same robot and/or painting paths. Further, the aforementioned adaption is possible between a plurality of robots of different painting zones and/or between a plurality of robots of different painting lines (with essentially identical painting tasks to be fulfilled and/or the same robot paths to be traversed). A message and/or an adaptation can occur in the painting zones, the painting lines and/or the paint shop.

One should note that it is practically impossible to realize an absolutely corresponding and/or identical or symmetrical dynamic behavior and/or an identical load characteristic value. However, it is sufficient that the adapted dynamic behavior and/or the adapted load characteristic value lies within a tolerance range of, for example, ±10%, ±5%, ±2%, ±1%.

Advantageously, painting results/qualities, for example, may be independent of robot positioning ranges and/or positioning ranges of a robot which deviate from one another (for example in the near and the remote area of the robot) and/or are independent of at least minor differences between the first robots and the second robot.

Further, it is advantageously possible to achieve a situation, after commissioning of the robot(s), where painting with a robot, which should paint on identical or symmetrically arranged paths and/or identical or symmetrically arranged robot paths, is preferably uninfluenced at every point by the performance of the robot(s). Positioning ranges or path points, and/or turning points and/or curve points which require less performance, are advantageously painted in the same way as positioning ranges or path points and/or turning points and/or curve points which require the maximum performance of the robot(s). A plurality of robots with identical or symmetrical painting tasks and/or identical or symmetrical robot paths to be traversed (for example on the same side, next to one another or opposite each other, mirror-inverted) can also be adapted to one another so that it is advantageously of no consequence which of the robots takes on the painting task. For example there are rolling painting scopes for various robots so that a plurality of robots are loaded in the same manner or one is available as a reserve or one can be cleaned, serviced or repaired.

It is thus particularly advantageous that the painting result is independent of the robot performance of the robot(s) and/or independent of which robot takes on the painting task in a painting zone or painting line.

The synchronization, and/or adaptation of the dynamic behavior, and/or the load characteristic value, etc. can occur manually or automatically.

Furthermore, copying of a robot program is advantageously possible, in particular of a painting program, without any detrimental effects on the at least one workpiece to be painted.

Furthermore, the robot service life and/or robot lifetime can be predetermined, at least approximately, and/or altered, in particular optimized, in a targeted manner.

The first positioning range can, for example, comprise a certain first position or a plurality of positions. The first positioning range preferably refers to a certain robot path section that should be traversed by the robot, the first robot and/or the second robot, in particular an application element mounted on it.

The second positioning range can, for example, comprise a certain second position or a plurality of positions. The second positioning range preferably refers to a certain robot path section that should be traversed by the robot, the first robot and/or the second robot, in particular an application element mounted on it.

The robot, the first robot, and/or the second robot is/are preferably a painting robot for painting a workpiece or a plurality of workpieces (for example motor vehicle bodies, attachment parts for motor vehicle bodies, etc.), or generally an application robot which is designed for application of a fluid.

The dynamic behavior and/or the first load characteristic value of the first positioning range can, e.g., be adapted to the dynamic behavior and/or the load characteristic value of the second positioning range in order to achieve essentially corresponding (identical or symmetrical) painting qualities and/or painting results, at least in the first positioning range and second positioning range.

The painting quality and/or the painting result comprises, for example, an essentially identical layer thickness distribution and/or an essentially identical color tone and/or an essentially identical flow characteristic and/or an essentially identical structure and/or an essentially identical gloss, etc., of the applied paint and/or generally an essentially corresponding (identical or symmetrical) paint appearance.

The robot, the first robot and/or the second robot is/are preferably programmable and/or multi-axial.

The dynamic behavior comprises, in particular, a speed behavior and/or a positive and/or a negative acceleration behavior.

The dynamic behavior can, furthermore, comprise a movement behavior based on and/or along a robot path or a plurality of robot paths or at least sections thereof, which preferably have at least a curved section and/or a meandrous section.

A robot can, e.g., keep an essentially identical robot path in different first and second positioning ranges (for example in a near region and a remote region). It is also advantageously possible for the first robot and the second robot to keep essentially corresponding (e.g., identical or symmetrical) robot paths in the first positioning range and in the second positioning range.

It is possible that the robot(s) preferably execute(s) an identical or "symmetrical" robot program. It is also possible that the robot(s) preferably traverse(s) identical or "symmetrical" robot paths or at least sections thereof.

The robot paths that should be traversed by the robot, the first robot and/or the second robot, at least the robot path sections which are assigned to the first positioning range and the second positioning range, preferably correspond to one another. This is particularly the case if the robot paths, or at least the robot path sections which are assigned to the first positioning range and the second positioning range, are essentially identical and/or copyable and/or reproducible. This is furthermore, for example, the case if the robot paths, or at least the robot path sections which are assigned to the first positioning range and the second positioning range, are essentially symmetrical, in particular in mirror symmetry, and/or are essentially to be traversed identically but offset (for example to be traversed temporally and/or physically offset (for example one after the other)).

The first positioning range of the first robot and the second positioning range of the second robot may correspond to each other. This is particularly the case if the first positioning range of the first robot and the second positioning range of the second robot are at least approximately and/or essentially identical (but, for example, offset physically and/or temporally) and/or should be identical, but, for example, deviate from each other due to tolerances, or are essentially symmetrical, in particular in mirror symmetry.

For example, the first positioning range of the first robot and the second positioning range of the second robot correspond to each other if the robot paths of the first robot and the second robot, or at least the robot path sections which are assigned to the first positioning range of the first robot and the second positioning range of the second robot, are essentially identical (for example traversed temporally and/or physically offset) and/or are copyable and/or reproducible, but also if the robot paths of the first robot and the second robot, or at least the robot path sections that are assigned to the first positioning range of the first robot and the second positioning range of the second robot, are essentially symmetrical, in particular in mirror symmetry.

One should note that it is practically impossible to realize absolutely corresponding and/or absolutely identical or absolutely symmetric positioning ranges. However, it is sufficient when the positioning ranges lie within a tolerance range of, for example, ±10%, ±5%, ±2%, ±1%.

The first positioning range and the second positioning range of the one robot may be different positioning ranges (for example in the near area/remote area, strongly extended/less strongly extended, etc.).

It is possible, e.g., for a meandrous robot path or a meandrous painting method, that the turning points and/or curve points of the robot paths are essentially identical, quite independently of where the turning points and/or curve points are relative to the workpiece(s). It is therefore advantageously possible to have a secure path planning and/or a painting result at one location on one or workpieces can be transferred to another.

The load characteristic value may represent a maximum permissible loading. The maximum permissible loading can, for example, refer to the robot, the first robot and/or the second robot overall but also, in particular at least one robot axle, sub-assembly, individual parts, transmission, drive system, guides, bearing points, etc. on the robot, the first robot and/or the second robot.

It is possible that the load characteristic value is a mechanical and/or dynamic load characteristic value. The load characteristic value is preferably a torque and/or stress characteristic value, an acceleration characteristic value, which can refer to a positive and/or negative acceleration, a speed characteristic, a current and/or voltage characteristic value of a drive motor for the robot, the first robot and/or the second robot, or at least a regulation or control parameter of the drive system for the robot, the first robot and/or the second robot.

The dynamic behavior and/or the load characteristic value of the first positioning range preferably allows a greater loading than the dynamic behavior and/or the load characteristic value of the second positioning range. The first load characteristic value is, in particular, reduced to the second load characteristic value. The same can apply correspondingly to the dynamic behavior.

It is possible that a certain load characteristic value and/or a certain dynamic behavior (for example a certain maximum permissible speed and/or acceleration) for a certain robot path section and/or a certain positioning range of a robot is transferred to the whole robot path of the robot, or at least a part thereof, or to a robot path of one or more other robots, or at least a part thereof and/or to the robot program.

It may be made possible thereby that a whole robot path of a robot or a plurality of robot paths of various robots or at least significant parts thereof are adapted to a certain dynamic behavior and/or a certain load characteristic value.

Different load characteristic values and/or loads can be equalized. Thus, at least sectionally corresponding (e.g., identical or symmetrical) robot paths, speeds and/or accelerations can be travelled on the workpiece or the many workpieces, for example those assigned to a workpiece carrier, to be processed (e.g., painted).

It is possible to perform an adaptation of individual robot paths or robot path sections, individual robots or an adaptation of the painting areas of different robots or an adaptation of a painting zone or painting line, a plurality of painting zones or painting lines or even a whole paint shop. This could, for example, occur through recording the torques, the current values on the drive motor, the control parameters of the drives etc., wherein also other methods of measurement are conceivable such as a 3D measurement, e.g., in the painting cabin.

The dynamic behavior and/or the load characteristic value of the first positioning range is preferably adapted to the dynamic behavior and/or the load characteristic value of the second position range in order to achieve and/or traverse an essentially corresponding (identical or symmetrical) dynamic behavior, essentially corresponding (identical or symmetrical) robot paths (or at least sections thereof) or robot path deviations, essentially identical speeds, and/or essentially identical (positive and/or negative) accelerations at least in the first positioning range and in the second positioning range.

It is possible that a workpiece (for example a motor vehicle body or an attachment part for a motor vehicle body) is painted, correspondingly, overall, or at least significant parts thereof, e.g., with identical or symmetrical robot dynamics and/or identical or symmetrical painting results or paint appearance. It is furthermore possible that a number of workpieces (for example motor vehicle bodies or attachment parts for motor vehicle bodies) are painted, correspondingly, overall, or at least significant parts thereof, e.g., with an identical or a symmetrical robot dynamics and/or a corresponding (e.g., identical or symmetrical) painting result and/or paint appearance.

It is furthermore possible to arrange a transfer from zone to zone, line to line and/or paint layer to paint layer, in as far as one is dealing with identical or symmetrical robot paths. This can be the case in paint shops. An optimal robot path can theoretically be identical for the Primer, BC (BC1, BC2) ("Base Coat") and CC ("Clear Coat").

Synchronization and/or adaptation may occur over a plurality of, e.g., all, robots which paint the workpiece(s) and, in this way, a multiplicity, e.g., all, robots traverse at least essentially identical or symmetrical, e.g., identical or symmetrical, robot paths (in particular also the pathway, speed and/or acceleration). This should automatically take place in every robot control system. In the maximum configuration level the robots synchronize with one another directly. The synchronization and/or the dynamic behavior can be evaluated and/or displayed.

It is possible to establish which positioning range and/or which robot represents a "bottleneck", to which the robot or the other robots must adapt.

The "weakest" robot and/or the "weakest" positioning range may provide default setting for the others.

A reserve in the dynamics of the "weakest" can preferably be provided; otherwise, the parameters of the robot(s) would detrimentally change constantly. After a preferably one-time synchronization and/or adaptation of the robot(s), the robot(s) should no longer need to synchronize or only in exceptional cases. There is otherwise the risk of detrimentally influencing the painting results. After the first synchronization of the robot(s) with a reserve in the dynamic of the "weakest", the monitoring of the robot(s) should rather interpret any deviation as a task for servicing, for maintenance, or for repair.

A statistic for evaluation may be provided concerning a workpiece to be painted, a paint layer, a painting zone, a robot that has certain limitation(s) in the dynamic and/or the load characteristic value and/or the robot and/or painting path.

A limit value evaluation may be provided of when the changes indicate faults, aging, stiffness of movement, or a defect or an impending defect, and where interventions should be made, for example, through lubrication, maintenance, repair, etc.

For example, the robot, the first robot and/or the second robot can traverse a whole robot path or a plurality of whole (for example temporally and/or physically offset to be traversed) robot paths or at least significant parts thereof with an essentially corresponding (e.g., identical or symmetrical) robot dynamics.

The robot, the first robot and/or the second robot can execute a pre-programmed robot program in order to determine the dynamic behavior and/or the load characteristic value, which can occur online or off-line, for example, through use of a simulation tool.

It is furthermore possible that the robot, the first robot and/or the second robot is/are measured or measures itself in order to determine the load characteristic value and/or the dynamic behavior, and/or to determine differences in the dynamic behavior in the first positioning range and in the second positioning range.

The measurement takes place, e.g., after assembly of the robot, the first robot and/or the second robot and installation of the application equipment. It is, to a great extent, possible to simulate and determine the effect of the weights in advance using CAD (Computer Aided Design) and through use of a movement simulation. The tolerances in the mechanical components and the drives, for example, cannot be determined in this way. These can, however, be determined through the measurement.

It is possible that the dynamic behavior and/or the load characteristic values are determined continuously during operation of the robot, the first robot, and/or the second robot, whereby changes can advantageously be recorded during operation and can preferably be reacted to immediately.

It is possible that the dynamic behaviors and/or the load characteristic values can be adapted to one another cyclically or essentially continuously during operation of the robot, the first robot, and/or the second robot.

An adaptation of the dynamic behavior and/or the load characteristic value of the first positioning range to the dynamic behavior and/or the load characteristic value of the second positioning range leads to a change in the service life and/or lifetime of the robot, the first robot and/or the second robot or at least individual parts thereof.

It is possible that the at least approximate service life and/or lifetime of the robot, the first robot and/or the second robot, or at least individual parts thereof, are determined. Such determination may be made if the dynamic behavior and/or the load characteristic value of the first positioning range is adapted to the dynamic behavior and/or the load characteristic value of the second positioning range and, for example, a monitoring person or a programmer is shown the determination during programming of the robot, the first robot and/or the second robot, for example by a display.

It is possible that when, for example, a programmer adapts the load characteristic value and/or the dynamic behavior of the first positioning range to the load characteristic value and/or the dynamic behavior of the second positioning range during programming of the robot, the first robot and/or the second robot, the changing at least approximate service life and/or lifetime of the robot, the first robot and/or the second robot or at least individual parts thereof is determined, and that this is made accessible to the programmer for example by a display. This could also be transmitted to a higher-level control system (for example a zone control system) and/or a central process control system.

It is possible that the programmer is informed over the "dynamic settings" of the robot, the first robot and/or the second robot about the reduction or extension in the lifetime/service life in the form of percentage, for example on a display or in the simulation software.

It is possible that the dynamic behavior and/or the load characteristic value of the first positioning range is adapted to the dynamic behavior and/or the load characteristic value of the second positioning range in order to influence the at least approximate service life and/or lifetime of the robot, the first robot and/or of the second robot and/or at least individual parts thereof in a targeted manner, e.g., to extend and/or to shorten these by a defined amount or by an amount desired by the operator (for example the programmer).

It is possible that identical or identical, but physically and/or temporally offset robot paths, be traversed or symmetrical, preferably mirror image robot paths, or at least sections thereof, can be traversed and/or essentially corresponding (identical or symmetrical) painting results can be achieved despite the different dynamic or performance-specific options offered by the robot, the first robot and/or the second robot.

Further, during manufacture and/or setting of the robot(s), a characteristic value can be provided on a master curve, in particular a test program, with a larger loading for a plurality of axles, or the axles can run through a given curve with the highest permissible loading and the positive or negative deviation of the axial performance and/or the paths of motion in space can be calculated therefrom and given as a characteristic value to the robot(s). It is then possible using this characteristic value to make a first synchronization of the robot(s) for a painting zone, painting line and/or the paint shop.

Further, the robot, the first robot and/or the at least one second robot can, in particular, be designed as an application robot for application of a fluid, for example, to one or more workpieces (for example, as an application robot for application of sealing material, e.g., for sealing seams or for creating an underbody sealing, for application of flange hemming, for application of adhesive material or other desired materials). The features described herein with special reference to the painting robot or the painting therefore also apply in particular also generally to other application robots or other application types. It is possible that the robot(s) can also be designed as so-called handling robots.

Operating methods disclosed herein may be carried out by hardware and software that is suitable for and configured to allow carrying out the operating methods.

A control system may comprise an adaptation, programming and/or coating system, for a robot or a first robot and at least one further second robot. The control system is preferably configured and suitable to carry out the operating method described here.

For example, the control system can comprise a processor, functional units which are configured and suitable in order to carry out the steps of the operating method described herein, a memory, input and output interfaces and/or data lines for communication of data. The functional units can preferably be realized from a hardware point of view as separate components and/or subassemblies. There is, alternatively, also the option, however, that the respective functional unit(s) is (are) realized as a software module, for example, in a computer program.

A computer program and/or a computer-readable medium may comprise commands which, when executed by a processor and/or a computer, allows carrying out an operating method as described herein. A computer or a data processing unit may be used with such a computer program.

Further features of the control system, the computer program, the data processing unit and/or the computer-readable medium can be taken directly from the operating method described herein.

Furthermore, a robot, in particular an application robot or a painting robot may be configured and arranged to execute the operating method as described herein, and/or a control system as described herein.

An arrangement may be provided with at least two robots, in particular at least two application robots or painting robots, wherein the robots are configured and arranged to execute the operating method as described herein, and/or a control system as described herein.

The above features can be combined with one another in any desired manner. Other advantageous developments of the present subject matter is disclosed in the claims or are evident from the following description of preferred exemplary embodiments in conjunction with the attached figures. The figures show as follows:

Figure 1:
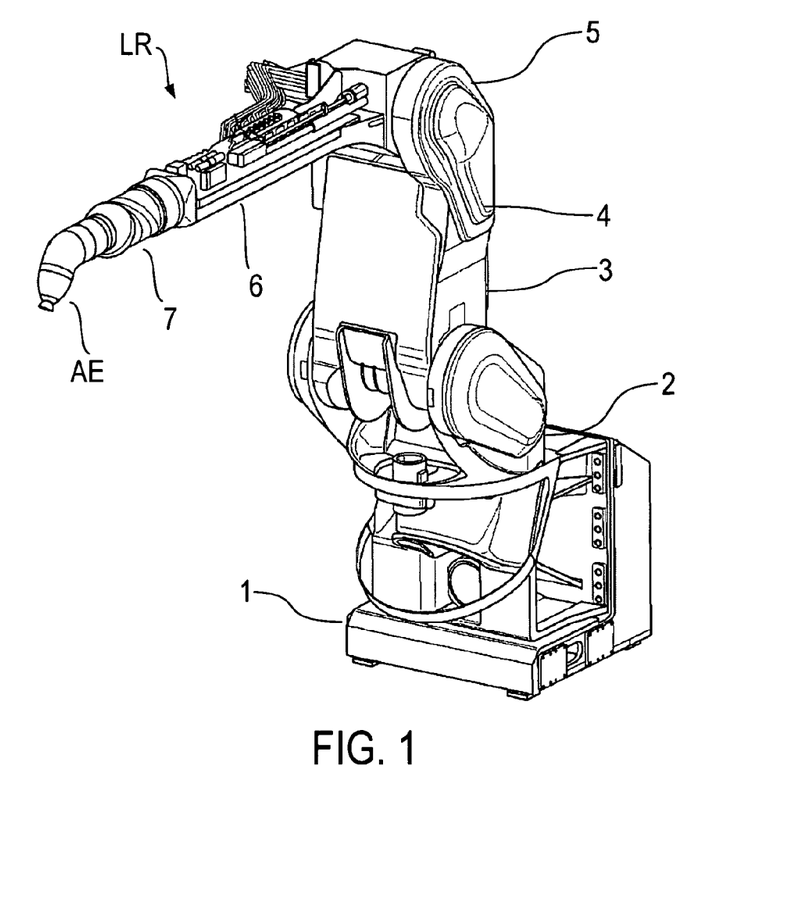
FIG. 1 an exemplary painting robot.

FIG. 1 shows a perspective view of a conventional exemplary multi-axial painting robot LR. The painting robot LR comprises a basic body 1, a drive housing 2, comprising a first axle and a second axle, a first arm 3, a transmission unit 4, including a third axle, a transmission unit 5, including a fourth axle, a fifth axle and a sixth axle, a second arm 6 and a hand axle 7. The painting robot LR can be mounted in a fixed position or movable longitudinally. Further, a docking slide and paint lines can be seen on the second arm 6. An application element AE (for example a rotary atomizer) is mounted on the hand axle 7 to apply paint.

Figure 2A:
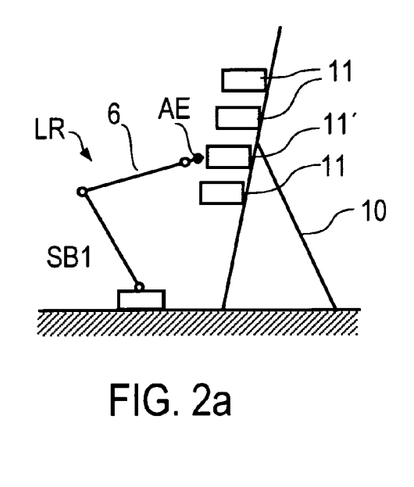
FIGS. 2a to 2c schematic representations of a painting robot according to FIG. 1 in a first positioning range according to a first exemplary embodiment, FIGS. 3a to 3c schematic representations of a painting robot according to FIGS. 2a to 2c in a second positioning range according to the first exemplary embodiment, FIG. 4 a flow diagram of a method according to an exemplary embodiment, FIG. 5a, 5b schematic representations of a first painting robot according to FIG. 1 in a first positioning range and a second painting robot according to FIG. 1 in a second positioning range according to a second exemplary embodiment, FIG. 6 a flow diagram of a method according to an exemplary embodiment, and FIG. 7 a schematic representation of a first painting robot in a first positioning range and a second painting robot in a second positioning range according to a further exemplary embodiment.
Figure 2B:
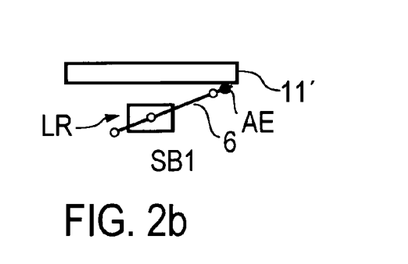
Figure 2C:
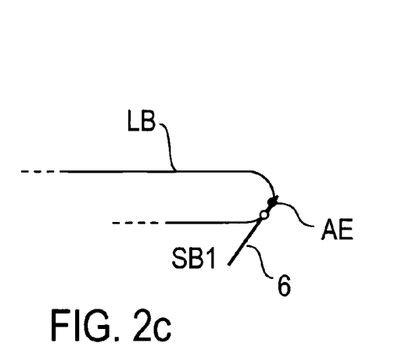
Figure 3A:
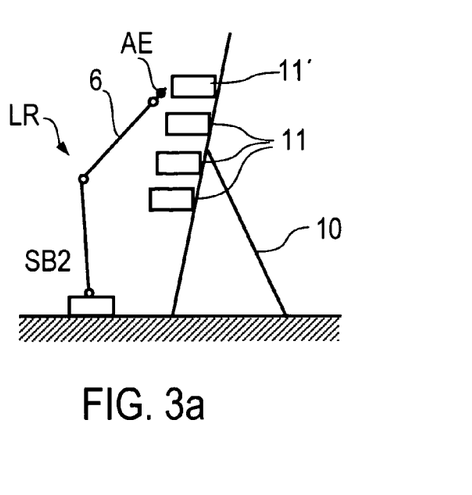

FIGS. 2a and 3a are schematic side views of the painting robot LR shown in FIG. 1 and workpieces 11 (for example bumper bars) to be painted, which are positioned on a workpiece carrier 10. A workpiece 11' that is subjected to a painting process shown in FIGS. 2a to 2c and 3a to 3c is denoted with an apostrophe following the reference number.

FIG. 2a shows a side view of the painting robot LR during operation in a first positioning range SB1, in order to paint a workpiece 11' positioned in the near area of the painting robot LR. FIG. 2b shows a view from above of the painting robot LR according to FIG. 2a. FIG. 2c shows a painting path section of a schematic exemplary painting path LB which should be traversed by the painting robot LR shown in FIGS. 2a and 2b and/or the application element AE mounted on it.

When traversing the painting path LB for painting the workpiece 11' in close proximity to the painting robot LR (FIGS. 2a, 2b, 2c), the painting robot LR runs through a plurality of positions and/or positioning ranges, for example, in which it is swiveled or moved around one or more axes. One of these positioning ranges can be seen schematically in FIGS. 2a to 2c and is identified with the reference sign SB1.

One particular painting path point can be assigned to a certain position of the painting robot LR while a certain painting path section can, e.g., be assigned to a certain positioning range of the painting robot LR.

Figure 3B:
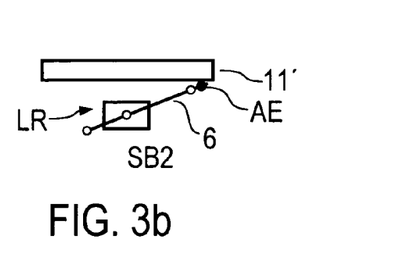
Figure 3C:
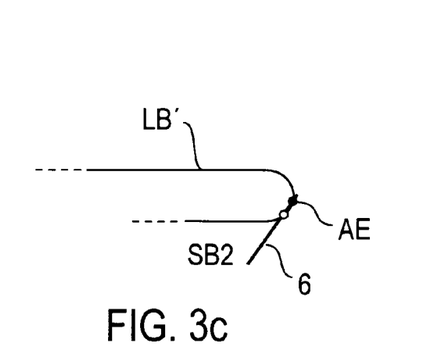

FIG. 3a shows a side view of the painting robot LR during operation in a second positioning range SB2, in order to paint a workpiece 11' positioned in the remote area of the painting robot LR. FIG. 3b shows a view from above of the painting robot LR according to FIG. 3a. FIG. 3c shows a painting path section of a schematic exemplary painting path LB' which should be traversed by the painting robot LR shown in FIGS. 3a and 2b and/or the application element AE mounted on it.

The painting path LB' shown in FIG. 3c corresponds to the painting path LB shown in FIG. 2c. The painting path LB' shown in FIG. 3c is identical to the painting path LB shown in FIG. 2c, but is traversed offset upwards.

When traversing the painting path LB' for painting the workpiece 11' in the remote area of the painting robot LR (FIGS. 3a, 2b, 2c), the painting robot LR runs through a plurality of positioning ranges, for example in which it is swiveled or moved around one or more axes. One of these positioning ranges can be seen schematically in FIGS. 3a to 3c, and is identified with the reference sign SB2.

The painting robot LR comprises a first dynamic behavior, for example in the first positioning range SB1, and at least one first load characteristic value that represents a maximum permissible loading of the painting robot LR in the first positioning range SB1.

The painting robot LR comprises a second dynamic behavior, for example in the second positioning range SB2, and at least one second load characteristic value that represents a maximum permissible loading of the painting robot LR in the second positioning range SB2.

Higher speeds and accelerations are usually possible in the near area of the painting robot LR based on lower loads (for example torques, stresses, etc.) than in the remote area. Different painting results will be achieved if these are actually used.

To avoid this disadvantage, the load characteristic values, loads and/or the dynamic behavior of the painting robot LR that occur during painting of the workpieces 11 are determined. The painting robot LR can execute the painting program or run through the individual painting path sections for this purpose and in this way, for example, measure and calculate the first and second load characteristic value. This can occur online or off-line, for example through use of a simulation tool. It is furthermore possible that the painting robot LR is measured or measures itself in order to determine the load characteristic values. Measurement of the painting robot LR in particular allows differences in the dynamic behavior of the painting robot LR to be determined.

The first dynamic behavior and/or the first load characteristic value of the painting robot LR, which are assigned to the first positioning range SB1, is/are adapted to the second dynamic behavior and/or the second load characteristic value, which are assigned to the second positioning range SB2. In this way, it is possible that the workpieces 11 are traversed and painted with the same dynamic, in particular corresponding painting paths LB, LB', i.e., identical painting paths but to be traversed offset, at the same speeds and the same accelerations.

The above-mentioned exemplary embodiment describes one case in which a robot is in particular extended in a vertical direction ("upwards or downwards").

There are, however, also exemplary embodiments in which a robot has to extend, e.g., in a depth direction, that is, for example, right across a workpiece lying transverse to the travelling direction (in particular attachment parts such as bumpers, bumper bars, etc. or an engine hood of a vehicle body). In this case the dynamic loading is usually even greater than for the case in which a robot has to extend in a vertical direction ("upwards or downwards").

Figure 4:
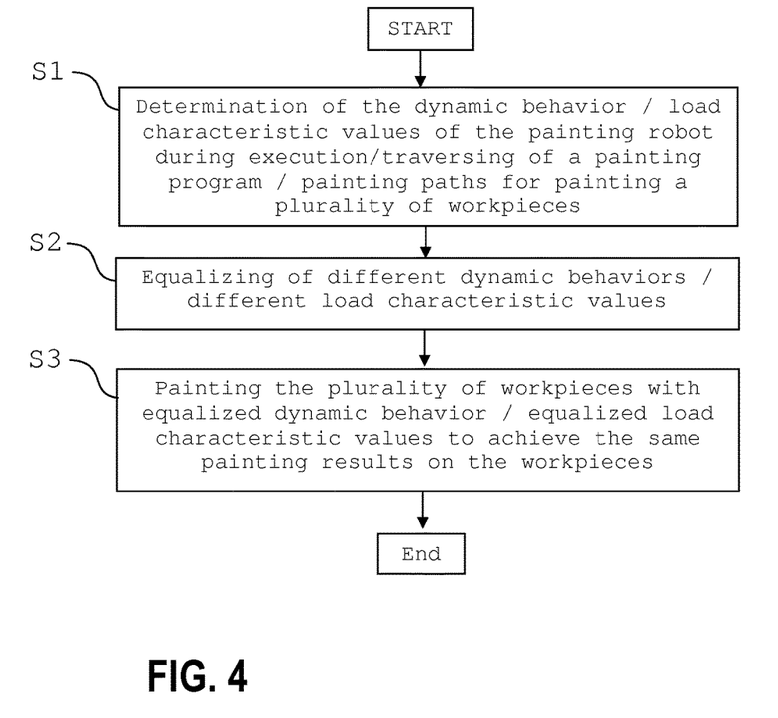

FIG. 4 shows a flow diagram of an operating method of a painting robot according to an exemplary embodiment, for example, the painting robot LR from the FIGS. 2a to 2c and 3a to 3c.

The dynamic behavior and/or the load characteristic values of the painting robot LR is determined in a step S1 during execution of a painting program and/or traversing of one or more painting paths to paint the workpieces 11.

Different dynamic behaviors and/or load characteristic values of the painting robot LR are equalized in a step S2 (at least the dynamic behavior and/or the load characteristic values of the first positioning range SB1 is adapted to the dynamic behavior and/or the load characteristic values of the second positioning range SB2).

In step S3 the workpieces 11 are traversed and painted using the equalized dynamic behavior and/or the equalized load characteristic values, in particular corresponding painting paths, at the same speeds and the same accelerations, whereby the same painting results are obtained on the workpieces 11.

Figure 5A:
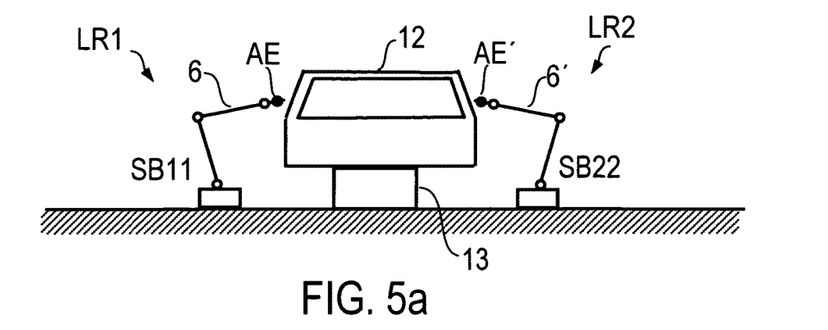
Figure 5B:
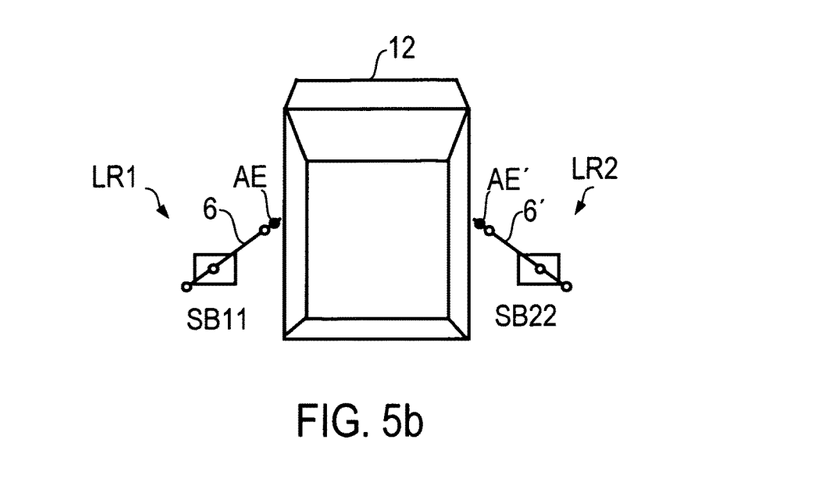

The exemplary embodiment according to FIGS. 5a and 5b partially conforms with the exemplary embodiment described above, wherein similar or identical parts are provided with the same reference signs and, to avoid repetitions, reference is also made to the exemplary embodiment described above for an explanation about them.

FIG. 5a shows a schematic side view of a first painting robot LR1 and a second painting robot LR2 and a workpiece 12 to be painted (for example a motor vehicle body), which is arranged on a conveyor belt 13. The painting robots LR1 and LR2 can be identically constructed painting robots as shown in FIG. 1. It is also possible for the painting robots LR1 and LR2 to be from different manufacturers. Reference sign 6 identifies the second arm and the reference sign AE the application element of the first painting robot LR1, while reference sign 6' identifies the second arm and the reference sign AE' the application element of the second painting robot LR2.

In FIG. 5a, the first painting robot LR1 can be seen in operation in a first positioning range SB11 in order to paint one side of the workpiece 12. In FIG. 5b, one can see a view from above of the first painting robot LR1 according to FIG. 5a.

In FIG. 5a, the second painting robot LR2 can be seen in operation in a second positioning range SB22 in order to paint the other side of the workpiece 12. In FIG. 5b, one can see a view from above of the second painting robot LR2 according to FIG. 5a.

The first painting robot LR1 and the second painting robot LR2 are positioned opposite to each other, in particular axle-symmetric or mirror-inverted, in order to paint both sides of the workpiece 12.

When traversing a painting path for painting the workpiece 12 on the one side, the first painting robot LR1 runs through a plurality of positioning ranges, for example in which it is swiveled or moved around one or more axes. One of these positioning ranges can be seen schematically in FIGS. 5a and 5b and is identified with the reference sign SB11.

One particular painting path point can be assigned to a certain position of the first painting robot LR1 while a certain painting path section can, e.g., be assigned to a certain positioning range of the first painting robot LR1.

When traversing a painting path for painting the workpiece 12 on the other side, the second painting robot LR2 runs through a plurality of positioning ranges, for example, in which it is swiveled or moved around one or more axes. One of these positioning ranges can be seen schematically in FIGS. 5a and 5b and is identified with the reference sign SB22.

One particular painting path point can be assigned to a certain position of the second painting robot LR2 while a certain painting path section can, e.g., be assigned to a certain positioning range of the second painting robot LR2.

The painting path of the first painting robot LR1 corresponds to the painting path of the second painting robot LR2. The painting path of the first painting robot LR1 and the painting path of the second painting robot LR2 are formed axle-symmetrically and/or mirror-inverted to each other.

The first positioning range SB11 of the first painting robot LR1 and the second positioning range SB22 of the second painting robot LR2 also correspond with one another as can be seen from FIGS. 5a and 5b. The first positioning range SB11 of the first painting robot LR1 and the second positioning range SB22 of the second painting robot LR2 are axle-symmetric and/or mirror-inverted to each other.

The first painting robot LR1 comprises a certain first dynamic behavior in the first positioning range SB11, and at least one certain first load characteristic value which represents a maximum permissible loading of the painting robot LR1 in the first positioning range SB11.

The second painting robot LR2 comprises a certain second dynamic behavior in the second positioning range SB22, and at least one certain second load characteristic value which represents a maximum permissible loading of the painting robot LR2 in the second positioning range SB22.

The first dynamic behavior and/or the first load characteristic value at least slightly deviate from the second dynamic behavior and/or the second load characteristic value due, for example, to uneven wear, in particular however due to tolerances in the mechanical components (for example axles, transmission, guides, bearing points, etc.).

To avoid this disadvantage, the load characteristic values, loads and/or the dynamic behavior of the first painting robot LR1 and the second painting robot LR2 are determined. This can occur as for the first exemplary embodiment, the description of which is referred to in order to avoid repetition.

It is possible within the context of the invention to adapt the dynamic behavior and/or the load characteristic value of the first painting robot LR1 in the first positioning range SB11 to the dynamic behavior and/or the load characteristic value of the second painting robot LR2 in the second positioning range SB22. In this way, it is possible that both sides of the workpiece 12 can be traversed and painted with the same and/or corresponding dynamics, in particular mirror-inverted painting paths, at the same speeds and the same accelerations.

It is furthermore possible that the load characteristic values, loads and/or the dynamic behavior of the first painting robot LR1 and of the second painting robot LR2 are determined essentially continuously or cyclically during operation of the first painting robot LR1 and the second painting robot LR2. It is then possible that the first load characteristic value and/or the first dynamic behavior of the first painting robot LR1 is adapted cyclically or essentially continuously during operation to the second load characteristic value and/or the second dynamic behavior of the second painting robot LR2.

Figure 6:
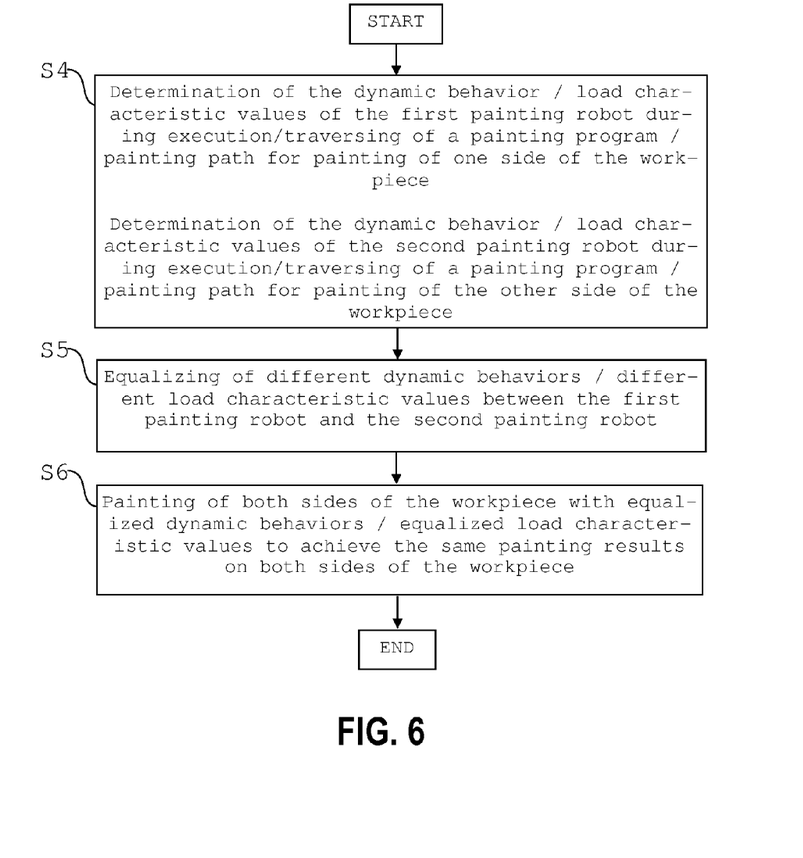

FIG. 6 shows a flow diagram of an operating method for painting robots according to an exemplary embodiment, for example the first and the second painting robots LR1 and LR2 from FIGS. 5a and 5b.

The dynamic behavior and/or the load characteristic values of the first painting robot LR is determined in a step S4 during execution of a painting program and/or traversing of one or more painting paths or at least sections thereof for painting one side of the workpiece 12. Furthermore the dynamic behavior and/or the load characteristic values of the second painting robot LR2 is determined during execution of a painting program and/or traversing of one or more painting paths or at least sections thereof for painting the other side of the workpiece 12.

Different dynamic behaviors and/or load characteristic values existing between the first painting robot LR1 and the second painting robot LR2 are equalized to one another in a step S5 (at least the dynamic behavior and/or the load characteristic values of the first positioning range SB11 of the first painting robot LR1 is adapted to the dynamic behavior and/or the load characteristic values of the second positioning range SB22 of the second painting robot LR2).

In a step S6, both sides of the workpiece 12 are traversed and painted with the equalized dynamic behavior and/or the equalized load characteristic values, in particular corresponding (mirror-inverted) painting paths, at the same speeds and the same accelerations, by the first painting robot LR1 and the second painting robot LR2, whereby corresponding (identical and/or symmetrical) painting results are achieved on both sides of the workpiece 12.

Figure 7:
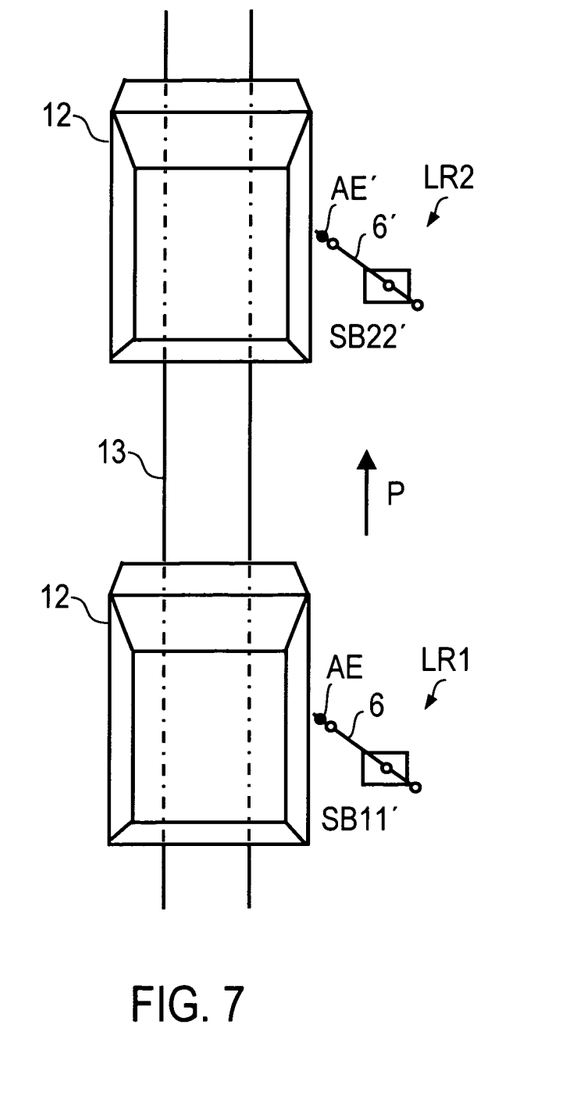

The exemplary embodiment according to FIG. 7 partially conforms with the exemplary embodiments described above according to the FIGS. 5a, 5b and 6, wherein similar or identical parts are provided with the same reference sign and, to avoid repetitions, reference is also made to the exemplary embodiment described above for an explanation about them.

The exemplary embodiment shown in the FIGS. 5a and 5b describes a case for which mirrored painting programs and/or robot paths can be executed/traversed, e.g., one painting robot paints on the left side of the workpiece 12 and one further opposing painting robot paints on the right side of the workpiece 12. Here the first positioning range and the second positioning range are axle-symmetric with respect to each other.

On the other hand, the exemplary embodiment shown in the FIG. 7 illustrates a case for which the same painting program and/or robot paths can be executed/traversed, in particular a painting robot LR1 initially, for example, applies 50% of the final painting layer thickness on the right-hand side of the workpiece 12 and then (temporally and physically one after the other) the second painting robot LR2 applies the remaining 50% of the final painting layer thickness on the right-hand side of the workpiece 12. Thus, the painting robots LR1 and LR2 shown in FIG. 7 execute, one after the other, the substantially same painting task.

The painting path of the first painting robot LR1 corresponds with and/or is identical to the painting path of the second painting robot LR2. The first positioning range SB11' of the first painting robot LR1 and the second positioning range SB22' of the second painting robot LR2 also correspond with one another as can be seen in FIG. 7. The first positioning range SB11' of the first painting robot LR1 is the same as the second positioning range SB22' of the second painting robot LR2.

Arrow P identifies the direction of travel of the conveyor belt 13.

It is also possible to paint again in a further painting cabin (for example Basecoat 1, Basecoat 2 or a wet-in-wet Primer, Basecoat, Clearcoat). In this case, at least three painting robots, and if required even more than three painting robots, execute the same path program, for example also for bumpers and paint shops with a high painting capacity or a plurality of lines with the same painting task.

The invention is not limited to the preferred exemplary embodiments described above. Instead, a plurality of variants and modifications is possible, which also make use of the concept of the invention and therefore fall within the scope of protection. The objects of the sub-claims can, in particular, also be realized independently of the features of the preceding and referred to claims.

The invention claimed is:
1. A method, comprising:
running two multi-axial paint application robots through a plurality of positioning ranges along respective first and second meandrous paths;
determining as an operating constraint of a first robot a first maximum permissible speed of the first robot representing a maximum permissible loading in a first positioning range;
determining as an operating constraint of a second robot a second maximum permissible speed of the second robot representing a maximum permissible loading in a second positioning range;
wherein the first maximum permissible speed is greater than the second maximum permissible speed, allowing the first robot to operate at higher speeds and accelerations than the second robot;
adapting the second maximum permissible speed as the operating constraint of the first robot such that both robots traverse a workpiece at the second maximum permissible speed for a whole of the paths; and
applying paint with the robots operating at the second maximum permissible speed.

2. The method of claim 1, wherein:
each of the one or more workpieces is one of a motor vehicle body and a part for a motor vehicle body.

3. The method of claim 1, further comprising adapting a first paint application result in the first positioning range to a second paint application result in the second positioning range.

4. The method of claim 1, wherein the meandrous paths are one of mirrored symmetrical paths and mirror-inverted symmetrical paths.

5. The method of claim 1, wherein a load characteristic value of the first positioning range and a load characteristic value of the second positioning range is at least one of:
a maximum permissible load limit value,
an electrical load characteristic value,
a mechanical load characteristic value,
a dynamic load characteristic value,
a moment or stress characteristic value,
a positive or negative acceleration characteristic value,
a speed characteristic value,
a current or voltage characteristic value of a drive motor for at least one of the robots,
at least one control parameter of the drive system for at least one of the robots, and
a value referring to at least one axle of at least one of the robots.

6. The method of claim 1, wherein at least one of a non-adapted dynamic behavior and a non-adapted load characteristic value of the first positioning range provides at least one of a greater speed, positive acceleration, and negative acceleration than at least one of a dynamic behavior and a load characteristic value of the second positioning range.

7. The method of claim 1, wherein the robots execute a robot program to determine at least one of the maximum permissible speed of the first positioning range and the second positioning range.

8. The method of claim 1, wherein the first maximum permissible speed of the first positioning range and the second maximum permissible speed of the second positioning range are determined using a simulation tool.

9. The method of claim 1, wherein the first robot is configured to measure itself to determine the first maximum permissible speed of the first positioning range.

10. The method of claim 9, wherein at least one of the robots is configured to measure itself to determine differences between the first maximum permissible speed in the first positioning range and the second maximum permissible speed in the second positioning range.

11. The method of claim 1, wherein the maximum permissible speeds of the first positioning range and the second positioning range are one of cyclically and essentially continuously determined during operation of the robots.

12. The method of claim 1, wherein the first maximum permissible speed of the first positioning range is one of cyclically and essentially continuously adapted during operation of the robots to the second maximum permissible speed of the second positioning range.

13. The method of claim 1, wherein an at least approximate service life of at least one of the robots, or at least individual parts thereof, is determined according to the first maximum permissible speed of the first positioning range being adapted to the second maximum permissible speed of the second positioning range.

14. The method of claim 1, wherein the first maximum permissible speed of the first positioning range is adapted to the second maximum permissible speed of the second positioning range in order to influence an at least approximate service life of at least one of the robots.

15. The method of claim 1, wherein the first positioning range and the second positioning range are essentially corresponding with each other.

16. A system comprising a control system that is configured to:
- run two multi-axial paint application robots through a plurality of positioning ranges along respective first and second meandrous paths;
- determine as an operating constraint of a first robot a first maximum permissible speed of the first robot representing a maximum permissible loading in a first positioning range;
- determine as an operating constraint of a second robot a second maximum permissible speed of the second robot representing a maximum permissible loading in a second positioning range;
- wherein the first maximum permissible speed is greater than the second maximum permissible speed, allowing the first robot to operate at higher speeds and accelerations than the second robot;
- adapt the second maximum permissible speed as the maximum permissible speed of the first robot such that both robots traverse a workpiece at the second maximum permissible speed for a whole of the paths; and
- apply paint with the robots operating at the second maximum permissible speed.

17. The system of claim 16, further comprising at least one of the robots, wherein the at least one robot is configured to include the control system.

18. The system of claim 16, wherein the robots include at least two application robots, wherein each of the robots is configured to include the control system.

19. A non-transitory computer-readable medium tangibly embodying instructions executable by a computer processor, the instructions including instructions to:
- run two multi-axial paint application robots through a plurality of positioning ranges along respective first and second meandrous paths;
- determine as an operating constraint of a first robot a first maximum permissible speed of the first robot representing a maximum permissible loading in a first positioning range;
- determine as an operating constraint of a second robot a second maximum permissible speed of the second robot representing a maximum permissible loading in a second positioning range;
- wherein the first maximum permissible speed is greater than the second maximum permissible speed, allowing the first robot to operate at higher speeds and accelerations than the second robot;
- adapt the second maximum permissible speed as the operating constraint of the first robot such that both robots traverse a workpiece at the same speeds and accelerations to apply paint to one or more workpieces at the second maximum permissible speed for a whole of the paths; and
- apply paint with the robots operating at the second maximum permissible speed.

* * * * *